MAGNETIC RECORDING AND REPRODUCING APPARATUS

Filed Aug. 18, 1966 Sheet 1 of 4

INVENTOR.
Hidefumi Furusawa

BY Hill, Sherman, Meroni, Gross & Simpson ATTORNEYS

INVENTOR.
Hidefumi Furusawa

BY Hill, Sherman, Meroni, Gross & Simpson ATTORNEYS

INVENTOR.
Hidefumi Furusawa

BY Hill, Sherman, Meroni, Gross & Simpson ATTORNEYS

INVENTOR.
Hidefumi Furusawa

BY Hill, Sherman, Meroni, Gross & Simpson ATTORNEYS

United States Patent Office
3,439,879
Patented Apr. 22, 1969

3,439,879
MAGNETIC RECORDING AND REPRODUCING APPARATUS

Hidefumi Furusawa, Tokyo, Japan, assignor to Nippon Columbia Kabushikikaisha (Nippon Columbia Co., Ltd.), Tokyo, Japan, a corporation of Japan
Filed Aug. 18, 1966, Ser. No. 573,329
Claims priority, application Japan, Aug. 23, 1965, 40/68,838
Int. Cl. G11b 5/78, 5/02
U.S. Cl. 242—55.12 7 Claims

ABSTRACT OF THE DISCLOSURE

A magnetic recording and reproducing apparatus which is constructed so as to utilize minimum space and with the supply and takeup reels mounted on the recorder so that their axes fall generally on a diagonal line relative to the top of the case so as to take up minimum space and allow small recorders to be built. The takeup reel is also provided with self-threading means so as to allow rapid threading in operation.

This invention relates to a magnetic recording and reproducing apparatus and more particularly to such an apparatus which is adapted to facilitate the threading of a tape to a takeup reel and has an improved space availability for miniaturization thereof.

Accordingly, it is one object of this invention to provide a magnetic recording and reproducing apparatus wherein the threading of a tape is very easy.

It is another object of this invention to provide a magnetic recording and reproducing apparatus which is compact in construction.

It is a further object of this invention to provide a semi-automatic threading type magnetic recording and reproducing apparatus.

It is still a further object of this invention to provide a magnetic recording and reproducing apparatus wherein the threading of a tape can be initiated with mere insertion of one end portion of the tape into guide means of a takeup reel.

Other objects, features and advantages of this invention will become apparent from the following description taken in conjunction with the accompanying drawings, in which.

Figure 1:
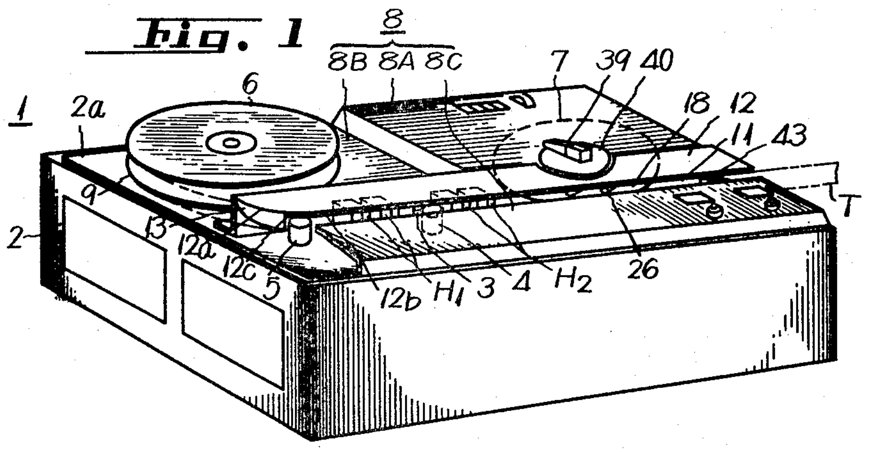
FIGURE 1 is a perspective view schematically illustrating an example of a magnetic recording and reproducing apparatus according to this invention.

With reference to the drawings one example of this invention will be described in detail. In FIGURE 1 reference numeral 1 identifies generally a magnetic recording and reproducing apparatus according to this invention, and reference numeral 2 indicates its casing. Reference characters $H_1$ and $H_2$ designate two magnetic head assemblies. Located between the magnetic head assemblies are a capstan 3 and a pinch roller 4 for driving a magnetic medium such, for example, as a magnetic tape T indicated in broken lines. The magnetic tape T, while being driven, is selectively urged into contact with the magnetic head assembly $H_1$ or $H_2$ by means of pad members (not shown) disposed in opposing relation to the magnetic head assemblies $H_1$ and $H_2$ to thereby effect recording, reproducing and erasing respectively. Reference numeral 5 indicates a tape guide roller, which serves to change the travelling direction of the tape T substantially at right angles. Reference numerals 6 and 7 represent a supply and a take up reel for winding thereon the magnetic tape T. With the initiation of driving the tape T, the tape T wound on the supply reel 6 is taken up on the takeup reel 7 in known manner.

In this invention the so-called dressed panel 8 or an escutcheon panel consisting of portions 8A, 8B and 8C is mounted on the casing 2 in such a manner as to overlie its opening *2a*. In this case, a reel disc 28 (shown in FIGURE 2) for supporting the reel 7 is positioned under the panel 8 and a reel disc 6′ (shown in FIGURE 9) for supporting the reel 6 is disposed on the panel 8.

It is preferred that the two reels 6 and 7 loaded on the discs 28 and 6′ are substantially flush with each other. In order to dispose the two reels 6 and 7 on substantially the same level, the reels 6 and 7 are loaded on the discs 28 and 6′ in a manner so that their lower flanges 9 and 18 may be substantially flush with each other. In this case, the reel 7 disposed under the panel 8 need not be provided with an upper flange, because the portion 8A of the panel 8 serves as an upper flange of the reel 7. This is of particular utility in the practice of this invention, which will be described in the latter part of this specification. For this purpose, the portion 8A of the panel 8 overlying the reel 7 is elevated at least the tape width from the level of the portion 8B on which the reel disc 6′ is mounted. Further, the panel portions 8A and 8C are spaced apart a predetermined distance at a location overlying the reel 7, to provide a gap 11 therebetween. This gap 11 forms a part of the path of the magnetic tape T to be wound on the reel 7.

Meanwhile, a guide panel 12 is mounted on the panel 8 for guiding the magnetic tape T from the reel 6 to the reel 7, the guide panel 12 extending from the position opposite the reel 6 to the position overlying the reel 7, as clearly shown in FIGURE 1. Marginal edges *12a* and *12b* of the guide panel 12 extend along the passage of the tape T, the tape T passing from the reel 7 through the peripheral surface of the guide roller 5, through the surface of the magnetic head assembly $H_1$, between the capstan 3 and the pinch roller 4, through the surface of the magnetic head assembly $H_2$, along the marginal edge of the portion 8A of the panel, and then to the reel 7. A corner marginal edge 12 between the marginal edges *12a* and *12b* is curved or trimmed so as to facilitate the travel of the magnetic tape T. Further, it is preferred to provide the marginal edge *12a* and, if necessary, the corner marginal edge *12c* with a sloping face 13 which gradually inclines down inwardly of the guide panel 12. In this case, the sloping face 13 is also curved in accordance with the curvature of the corner marginal edge *12c*.

The guide panel 12 can be adapted to serve as the so-called head housing covering the magnetic head assemblies $H_1$ and $H_2$. The portion 8C of the panel 8 facing the marginal edges *12a* and *12b* of the guide panel 12 is made lower than the guide panel *12c* so as not to disturb the threading of the magnetic tape T along the marginal edges *12a* and *12b*.

On the extension of the marginal edge 12$b$ of the guide panel 12, there is provided, for example a pair of resilient holding members 43 for resiliently holding the tape end T$a$ therebetween.

The reel 6, which is placed on the panel 8 while in use, may be a usual one, but it is preferred that the other reel 7 disposed under the panel 8 is the so-called automatic threading type one which is capable of accomplishing the winding of the tape T even under the panel 8.

Figure 3:
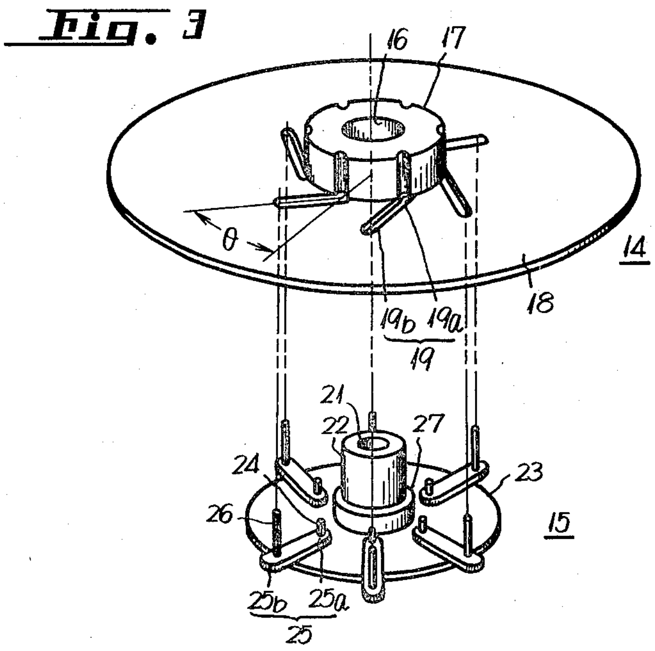
FIGURE 3 is a broken perspective view schematically illustrating an example of a reel usable in the apparatus of this invention.

In FIGURE 3 there is illustrated one example of such a reel in diagrammatic manner. That is, the reel 7 comprises a reel member 14 and tape guide means 15 which cooperate with the guide panel 12 to guide the magnetic tape T and with the reel member 14 to retain thereon the tape end T$a$. The reel member 14 is provided with a central aperture 16, a boss 17 for winding thereon the tape T and a lower flange 18 affixed to one end face of the boss 17 substantially concentrically therewith and approximately at right angles to the axis thereof. The flange 18 has provided therein a plurality of slots 19 each of which extends biased in, for example, the clockwise direction outwardly from the base of the boss 17, the slots 19 extending a predetermined length at a predetermined angle $\theta$ to the radial direction and being spaced apart a predetermined angular distance. The circumferential surface of the boss 17 has formed therein grooves extending axially thereof from the positions corresponding to the inner ends 19$a$ of the slots 19.

While the guide means 15 have a centrally disposed aperture 21 and consist of a boss 22 to be loosely fitted into the central aperture 16 of the boss 17 of the reel member 14 and a plate member 23 affixed to one end face of the boss 22 substantially at right angles to the axis thereof and concentrically therewith. The plate member 23 has planted thereon a plurality of pivots 24 on the same circumference about the axis of the boss 22 at angular intervals similar to those of the grooves 20 of the boss 17 and the slots 19 of the flange 18, and each of the pivots 24 has rotatably journalled thereto a rotary arm 25 at its one end 25$a$. The free end 25$b$ of each rotary arm 25 has planted thereon a pin or a roller 26 which can be loosely fitted into each slot 19 of the flange 18.

Figure 4:
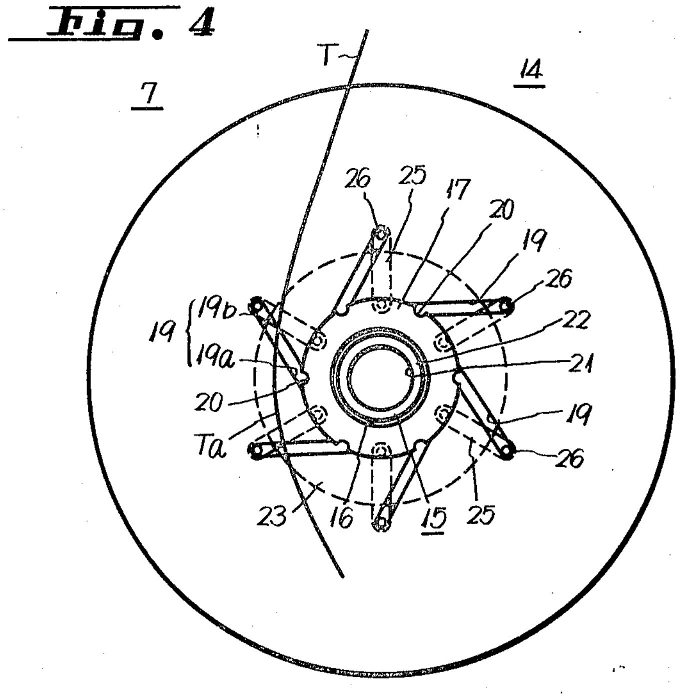
FIGURES 4 and 5 are schematic diagrams for explaining the operation of the reel depicted in FIGURE 3.

Then, the guide means 15 and the reel member 14 are assembled together in such a manner that the boss 22 of the guide means 15 is fitted into the central aperture 16 of the boss 17 of the reel member 14, having the pins or rollers 26 fitted into the slots 19 of the reel member 14 as illustrated in FIGURE 4.

In this case, the boss 22 of the guide means 15 is equipped with a stepped portion 27 for receiving the flange 18 of the reel member 14 so as to provide a space between the flange 18 and the plate member 23 of the guide means 15, enabling the rotary arm 25 of the guide means 15 to rotate freely in the space thus defined.

Figure 5:
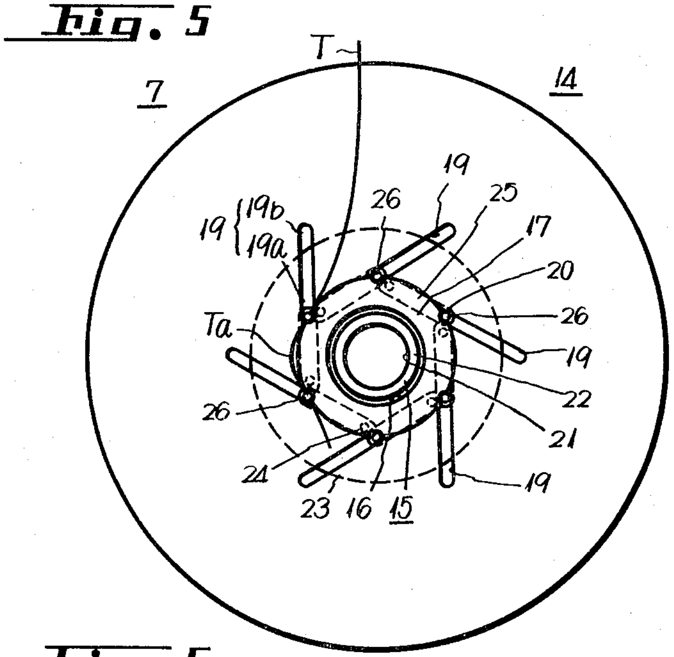
Figure 6:
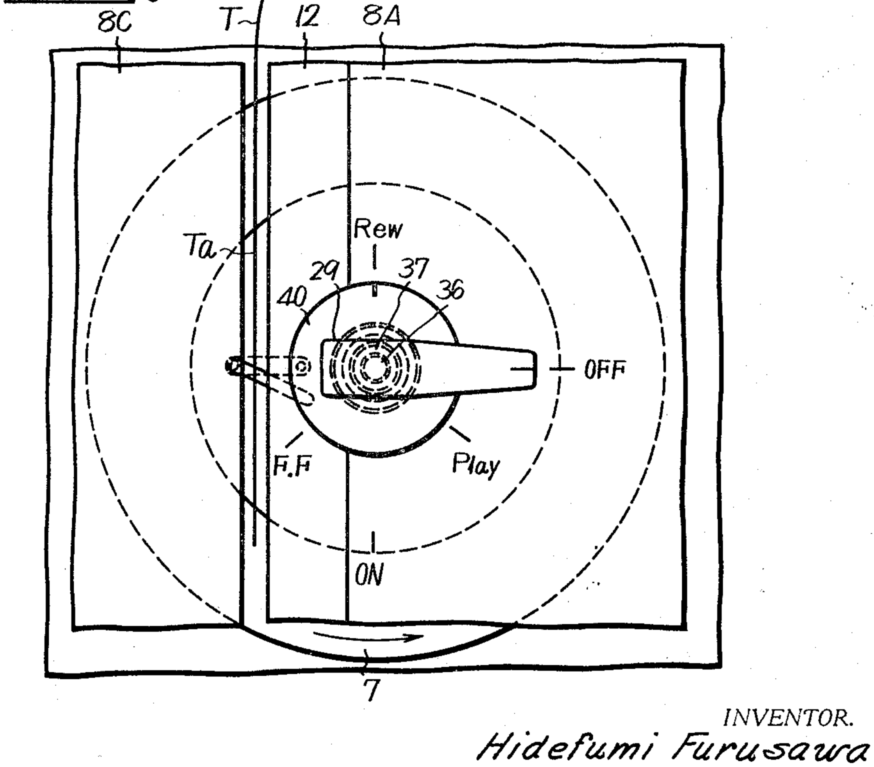
FIGURE 6 is a plan view showing the arrangement of knobs on the panel of the apparatus according to this invention.

In order to wind the tape T on the reel 7 of such a construction as above described, the pins or rollers 26 of the guide means 15 are made to stay at the outer ends 19$b$ of the slots 19 of the reel member 14 and the end portion T$a$ of the tape T is inserted between some of the pins or rollers 26 and the circumferential surface of the boss 17 of the reel member 14, as illustrated in FIGURE 4. Under such conditions, the guide means 15 is turned in the anticlockwise direction in which the pins or rollers 26 are thereby moved from the outer ends 19$b$ to the inner ends 19$a$ of the slots 19. Thus, the tape end portion T$a$ is pressed against the peripheral surface of the boss 17 by the pins or rollers and is further pressed into the grooves 20 formed on the peripheral surface of the boss 17, thus the tape end portion T$a$ being retained at the boss 17, as clearly shown in FIGURE 5. After this, the guide means 15 and the reel member 14 are rotated together in the anticlockwise direction due to the engagement of the pins or rollers 26 with the inner ends 19$a$ of the slots 19, so that the tape T is wound on the boss 17.

Figure 2:
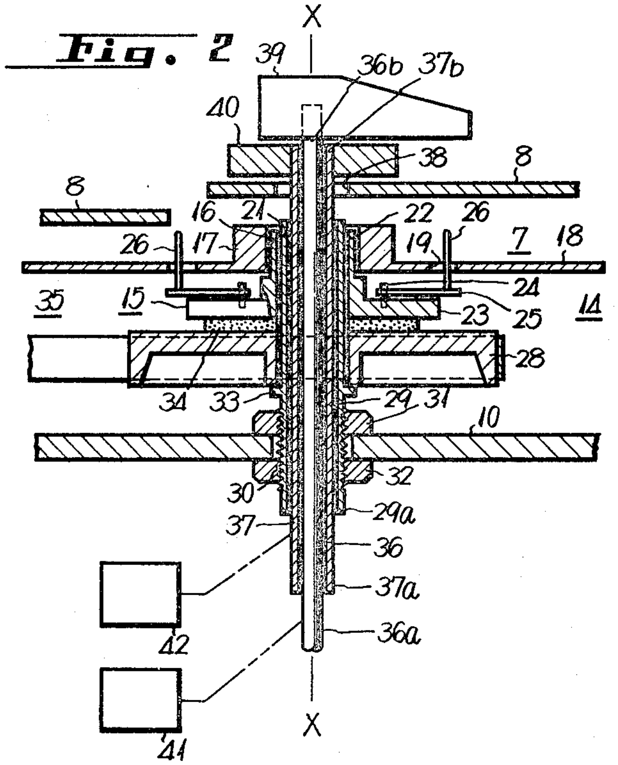
FIGURE 2 is a cross-sectional view schematically illustrating the principal part of the apparatus shown in FIGURE 1.

In order to dispose the reel disc 28 under the panel 8 within the casing 2, a shaft sleeve 29 serving as the rotary shaft of the reel 7 is planted on a base plate or a chassis 10 provided within the casing 2, as illustrated in FIGURE 2.

The circumferential surface of the shaft sleeve 29 is equipped with screw threads 30 at its lower end 29$a$. The lower end 29$a$ of the shaft sleeve 29 is fitted into an aperture made in the base plate 10 and is clamped to the base plate 10 by means of nuts 31 and 32 to thereby fixedly plant the shaft sleeve 29 on the base plate 10, as depicted in FIGURE 2.

The shaft sleeve 29 is further equipped with a flange 33 and the reel disc 28 is loaded thereon. Further, a friction plate member 34 is placed on the reel disc 28 and then the reel 7 is mounted thereon. Due to the frictional engagement of the friction member 34 with the plate member 23, the reel disc 28 and the reel 7 are held in frictional contact with each other, so that the reel 7 can be rotated together with the reel disc 28. Then, the reel disc 28 is coupled with the rotary shaft of a reel drive motor (not shown) through a belt transmission mechanism 35 and is thereby driven.

In a usual magnetic recording and reproducing apparatus, knobs for changing-over "record," "stop," "rewind" and "fast forward" operations are juxtaposed on the dressed panel having mounted thereon reel discs, magnetic heads and so on. In this case, however, the area of the dressed panel cannot be fully reduced, which prevents miniaturization of the apparatus.

In view of this, in this invention the reel 7 is disposed under the panel 8 as above described, and hence the knobs can be positioned on the panel 8 in overlying relation to the reel 7. Such an arrangement enables the reduction of the area of the dressed panel, which leads to miniaturization of the apparatus. In connection with this, a description will be given more in detail, referring to FIGURE 2. That is, a rotary shaft 36 is inserted into the shaft sleeve 29 concentrically therewith and rotatably about the axis X—X, and further a rotary shaft sleve 37 is similarly into the sleeve 29 between the rotary shaft 36 and the sleeve 29 concentrically therewith and rotatably about the axis X—X thereof. Then, the upper ends 36$b$ and 37$b$ of the rotary shaft 36 and the rotary shaft sleeve 37 are projected out of an aperture 38 made in the dressed panel 8, and knobs 39 and 40 are affixed to the projected ends 36$b$ and 37$b$. These knobs 39 and 40 are arranged in overlapping but spaced relation to each other in the direction of the axis X—X, namely the knob 39 affixed to the rotary shaft sleeve 37 is located under the knob 40 secured to the rotary shaft 36, as clearly shown in FIGURE 2. In this case, the lower knob 40 is, for example, disc-shape, while the upper knob 39 is lever-shaped so as to facilitate handling of either knob. It should be noted that although the knobs 39 and 40 are affixed to the rotary shaft of the reel 7 in the illustrated example, they can be located on the panel 8 at any other suitable places. Namely, they can be disposed in such positions as shown in FIGURE 9.

The free end of the rotary shaft 36 is connected to a change-over unit 41 for causing a mechanical and electrical mechanism to switchingly turn on and off the magnetic recording and reproducing apparatus, while the free end of the rotary shaft sleeve 37 is coupled to a change-over unit 42 for causing a mechanical and electrical mechanism to switchingly perform the operations such as rewind and fast forward of the magnetic tape and so forth. With such an arrangement, the stop and drive of the magnetic recording and reproducing apparatus and the rewind and fast forward of the magnetic tape can be switchingly changed-over by turning the rotary shaft 36 and the rotary shaft sleeve 37 to their respective predetermined positions through the knobs 39 and 40 positioned on the panel 8.

Figure 7:
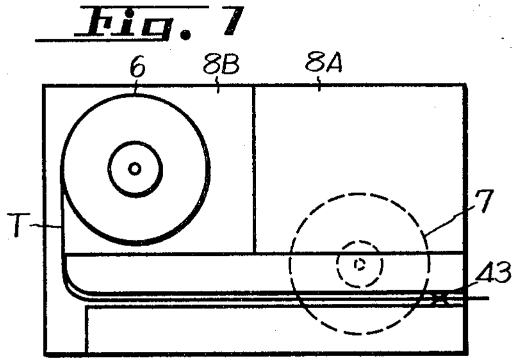
FIGURE 7 is a plan view schematically illustrating the relative arrangement of a supply and a takeup reel and a magnetic tape stretched therebetween in the apparatus of this invention.
Figure 8:
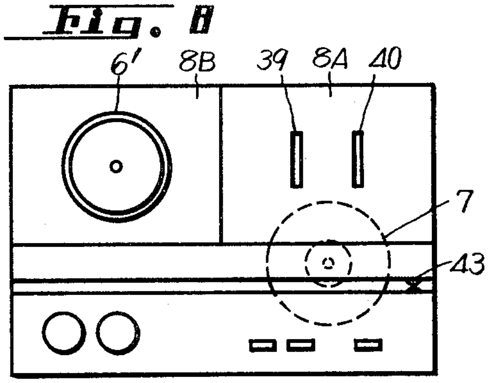
FIGURE 8 is a plan view of another apparatus produced according to this invention.

The use of the present invention greatly simplifies the threading of the magnetic tape T from the supply reel 6 to the takeup reel 7, as will be described just hereinbelow. In the first place, the change-over knob 39 is turned to the position of "stop" and the reel 7 is arranged such that the pin or rollers 26 stay at the outer ends 19*b* of the slots 19. Under such conditions, the end portion T*a* of the tape T is drawn along the marginal edges 12*a* and 12*b* of the guide panel 12 and is inserted between some of the pins or rollers 26 and the boss 17 of the reel 7 through the gap 11 and is then held by the resilient holding members 43. In this case, the reel 7 is not provided with an upper flange as described above, so that the tape T can easily be brought to the aforementioned position from above independently of the rotational position of the reel 7. That is, the threading of the tape T from the supply reel 6 to the takeup reel 7 is greatly easier than is conventional for other types of magnetic tape recorders. In the present invention the tape T travelling between the supply and the takeup reels 6 and 7 is approximately L-shaped, as depicted in FIGURE 7. While, in the prior art apparatuses the tape is substantially U-shaped, and when the apparatus is put erect the end portion of the tape comes down due to its weight at the initiation of the tape threading, namely the tape end portion T*a* slips out of position, so that the threading of the tape is difficult. In this invention, however, the tape T is substantially L-shaped between the supply and the takeup reels 6 and 7 as mentioned above, and hence the tape end portion T*a* does not move in such a direction as to disengage from the takeup reel 7 at the start of the tape threading. Therefore, the tape threading can be carried out with greater ease than in the prior art apparatuses. Further, even if the apparatus is set up lengthwise such that the tape passage is substantially inverted L-shaped, namely the tape runs down to the takeup reel from the supply reel, the tape threading is easy also in this case. After the tape end portion T*a* has been held between the resilient holding members as described above, the change-over knob 40 is turned to assume a position for record, playback, fast forward or rewind, and then the change-over knob 39 is turned to assume a position for drive. Thus, the reel disc 28 is rotated to thereby turn the guide means 15 together, so that the tape T is guided, by the pins or rollers 26 under the dressed panel 8, to be held between the pins or rollers 26 and the boss 17 of the reel 7, with the tape end being pulled out from between the resilient holding members 43. Upon initiation of the winding of the tape, reproduction or record by the magnetic head assembly $H_1$ or fast forward or rewind of the tape is initiated. In this case, it is possible to design the apparatus such that it is put in condition for recording by pushing another record button while the knob, for example, 40 is held at a position of reproduction.

Further, by designing the apparatus such that the tape driving is automatically stopped shortly prior to disengagement of the tape and portion from the supply reel 6, rewind of the tape T can readily be accomplished by reversal of the sense of rotation of the rotary shafts after completion of the winding of the tape T on the takeup reel 7. During this rewind of the tape recording or reproducing can be effected by the magnetic head assembly $H_2$, namely recording and reproducing can be accomplished in two directions.

In accordance with this invention the reel 7 is positioned under the panel 8 and accordingly various knobs such as the changeover knobs 39 and 40 and so forth can be mounted on the shaft of the reel 7 as described and illustrated. This results in enhancement of the space availability and in reduction of the area of the dressed panel, which enables miniaturization of the apparatus. Further, the threading of the tape T from the reel 6 to the reel 7 can be accomplished by guiding the tape end portion T*a* along the guide panel 8, namely the tape end portion T*a* can be retained on the boss 17 of the reel 7 by cooperation of the panel 8 and the guide means 15 of the reel 7. Therefore, the tape threading is very easy.

Further, the provision of the sloping face 13 in the guide panel 8 facilitates insertion of the tape T downwardly of the panel 8, namely it is sufficient merely to guide the end portion T*a* of the tape T along the sloping face 13. Meanwhile, the guide roller 5 may be tapered so as to facilitate receiving of the tape thereon.

It will be apparent that many modifications and variations may be effected without departing from the scope of the novel concepts of this invention.

What I claim is:

1. A magnetic recording and reproducing apparatus comprising a casing having a rectangular front panel, a magnetic medium, a supply reel, a takeup reel, said supply and takeup reels being disposed on the top of said casing, rotational shafts for driving said supply and takeup reels, means for recording information on said magnetic medium and reproducing the recorded information therefrom, and guide means for guiding said magnetic medium from said supply reel to said takeup reel, the rotational shafts for driving said supply and takeup reels being aligned on a line oblique to each side of said rectangular panel, said guide means being so arranged with respect to said reels to change the direction of travel of said magnetic medium between said supply and takeup reels only once, and the portions of said magnetic medium on both sides of said guide means being substantially straight.

2. A magnetic recording and reproducing apparatus as claimed in claim 1 including a first guide panel attached to the top of the casing and covering said magnetic medium between the guide means and the takeup and supply reels, and a second guide panel attached to the casing and partly overlying said takeup reel.

3. A magnetic recording and reproducing apparatus as claimed in claim 1 wherein said takeup reel comprises a single flange having mounted thereon a first boss, said single flange having formed therein a plurality of slots in the oblique direction from the circumference of said boss, a magnetic medium guiding member consisting of a second boss rotatably fitted to said first boss, a plate attached to the second boss, a plurality of rotary arms each pivoted to said plate at one end thereof, a pin attached to the free end of each of said rotary arms, each of said pins received into each of said slots in said flange and guided thereby when said plate rotates in operative condition.

4. A magnetic recording and reproducing apparatus, as claimed in claim 1, comprising an operating knob disposed coaxial with the axis of said takeup reel.

5. A magnetic recording and reproducing apparatus as claimed in claim 1, comprising a shaft with a knob for operating magnetic and reproducing apparatus extends through the central aperture of the rotary shaft of said takeup reel.

6. A takeup reel comprising a single flange, a first boss mounted on the single flange, said flange having formed therein a plurality of slots in the oblique direction from the circumference of said first boss, a magnetic medium guiding member consisting of a second boss rotatably attached to said first boss, a plate attached to the second boss, a plurality of rotary arms each pivoted to said plate at one end thereof and having a pin at the free end of each of said rotary arms, each of said pins engaging into a respective slot and guided thereby when said plate rotates in operative condition.

7. A takeup reel as claimed in claim 6, wherein said first boss of said single flange has formed thereon a plurality of grooves along its axis, each of said plurality of grooves being located at the position corresponding to each of said slots, and said second boss has a stepped portion for receiving said single flange when said second mentioned boss is fitted into said first mentioned boss, and a predetermined space being provided between said flange and said plate when said reel member and magnetic medium guide member are assembled together.

References Cited

UNITED STATES PATENTS 3,191,741 6/1965 Landgraf ---------- 242—74 X 3,265,318 8/1966 Ellmore ------------- 242—74

3,331,563 7/1967 Roecks et al. ------ 242—55.12

LEONARD D. CHRISTIAN, *Primary Examiner.*

242—74